(12) United States Patent
Anderson

(10) Patent No.: US 11,178,865 B2
(45) Date of Patent: Nov. 23, 2021

(54) ANIMAL DISPERSION SYSTEM AND METHOD OF USING THE SAME

(71) Applicant: David Michael Anderson, Hinsdale, IL (US)

(72) Inventor: David Michael Anderson, Hinsdale, IL (US)

(*) Notice: Subject to any disclaimer, the term of this patent is extended or adjusted under 35 U.S.C. 154(b) by 334 days.

(21) Appl. No.: 16/389,150

(22) Filed: Apr. 19, 2019

(65) Prior Publication Data
US 2020/0329693 A1 Oct. 22, 2020

(51) Int. Cl.
| | | |
|---|---|---|
| A01M 29/10 | (2011.01) |
| F21V 13/06 | (2006.01) |
| F21V 23/00 | (2015.01) |
| F21V 15/01 | (2006.01) |
| F21V 5/04 | (2006.01) |
| F21Y 115/30 | (2016.01) |

(52) U.S. Cl.
CPC ............ *A01M 29/10* (2013.01); *F21V 5/04* (2013.01); *F21V 13/06* (2013.01); *F21V 15/01* (2013.01); *F21V 23/003* (2013.01); *F21Y 2115/30* (2016.08)

(58) Field of Classification Search
CPC .............. A01M 29/10; F21V 15/01; F21V 14/04–045; F21Y 2115/30
See application file for complete search history.

(56) References Cited

U.S. PATENT DOCUMENTS

2018/0051855 A1* 2/2018 Nishi .................... H01S 5/4025

FOREIGN PATENT DOCUMENTS

| CN | 103309357 A | * | 9/2013 |
|---|---|---|---|
| ES | 1072082 U | * | 5/2010 |
| JP | 2009153427 A | * | 7/2009 |
| JP | 3212816 U | * | 10/2017 |
| KR | 20150118229 A | * | 10/2015 |
| KR | 2018130429 A | * | 12/2018 |
| KR | 20200034170 A | * | 3/2020 |

* cited by examiner

*Primary Examiner* — Mariceli Santiago
(74) *Attorney, Agent, or Firm* — Saul Ewing Arnstein & Lehr LLP

(57) ABSTRACT

An animal dispersing system includes a laser diode light source to produce a resultant beam of light within a wavelength region of 400-700 nanometers, and a rotatable reflective member and lens configured in the housing. The rotatable reflective member is rotatingly coupled to an actuator, wherein the at least one laser diode light source is mounted coaxially to an axis of the rotatable reflective member. The animal dispersion system also includes a controller to cyclically turn the actuator on and off for adjusting a speed and direction of the beam of light, and cyclically turn on the at least one laser diode light source for adjusting a pattern generated by the beam of light, such that the speed, direction, and the pattern is generated to disperse animals from a physical area.

19 Claims, 2 Drawing Sheets

ANIMAL DISPERSION SYSTEM AND METHOD OF USING THE SAME

FIELD OF INVENTION

The present invention generally relates to an animal dispersion system and, in particular, a light-based system and method for dispersing certain animals.

BACKGROUND

Conditions exist where animals can cause problems or become a nuisance. For example, birds can become a nuisance in the proximity of airports, over ponds, lakes, or other scenic venues. In other cases, birds can often congregate around ponds of golf courses or country clubs, which is often undesirable for people who play those golf courses.

Using bright light, especially laser light in the visible range, is a known non-lethal method to disrupt animals from inhabiting undesirable areas. These bright light methods include the use of fixed laser beams, fixed flashing lights, and rotatable laser beams. There have also been attempts to use intermittent lights to disrupt the habitat of unwanted animals, especially geese, causing them to take up residence elsewhere.

Conventional devices have been developed that rotate and flash laser light beams, flash static horizontal laser beams, or use of flashing non-laser light sources. These conventional devices and methods, however, often have shortcomings. For example, conventional devices that rotate a laser or flash laser light beams use motors that turn the laser light source. This limits the radial direction for a resulting light beam that can be generated due to cabling required for powering the laser light source. That is, they have the undesirable feature of requiring the power to be transferred to the lasers via a flexible wire or cable. Such an arrangement is complex, expensive, and has reduced system reliability.

Conventional devices may also flash static horizontal laser beams or use multiple horizontal laser light sources with a divergent beam (e.g., line lasers) to cover a desired area or region. These devices and methodology, however, are undesirable because they result in a vertically narrow beam and can be generally less reliable over uneven surfaces. Additionally, these devices also require multiple lasers to cover an entire area range (e.g., 360°) which results in increased cost.

Another conventional device can use a single flashing LED light to cover a 360° area of undulating surface. This, however, typically only provides limited range and effectiveness.

Accordingly, a system and method is needed for a light-based animal dispersion system that addresses these shortcomings.

SUMMARY

This invention relates to a system and method of providing a rotating and outwardly propagating laser beam for animal dispersion.

According to one embodiment, an animal dispersion system includes a laser diode light source and a rotatable reflective member arranged to produce a resultant beam of light. This beam may be within a wavelength range of 400-700 nanometers (visible light) and propagate outwardly to assist in the dispersion of animals such as geese.

The laser diode light source and the rotatable reflective member can be disposed within a housing and arranged such that the laser diode light source is mounted such that it is axially traverse to the axis of the rotatable reflective member. Accordingly, the rotatable reflective member can reflect the laser beam emitted from the laser diode light source at an angle outward from the housing. The rotatable reflective member can be operatively mounted on or coupled to a rotating member within the housing which can permit rotation. Accordingly, the resultant beam of light can be outwardly projected over all or part of a complete 360° area.

In addition, a lens can be arranged in the housing between the laser diode light source and the rotatable reflective member so as to change certain characteristics of or shape of the beam emitted from the laser diode light source. This lens, when mounted on the rotating member, maintains a consistent beam shape during rotation and provides additional control of the size, shape, or configuration of the resultant beam. In particular, the lens can optically disperse the initial beam emitted from the laser diode light source to form a straight line beam for reflection by the rotatable reflective member. Given this arrangement, typical outwardly resultant beam shapes are, but not limited to, linear, crossed, and spot with linear.

The animal dispersion system also includes a controller for cyclically operating an actuator for adjusting speed, direction, patterns, or shapes of the outwardly propagating beam of light, thus assisting in the dispersion of animals from a physical area.

DETAILED DESCRIPTION

Figure 1:
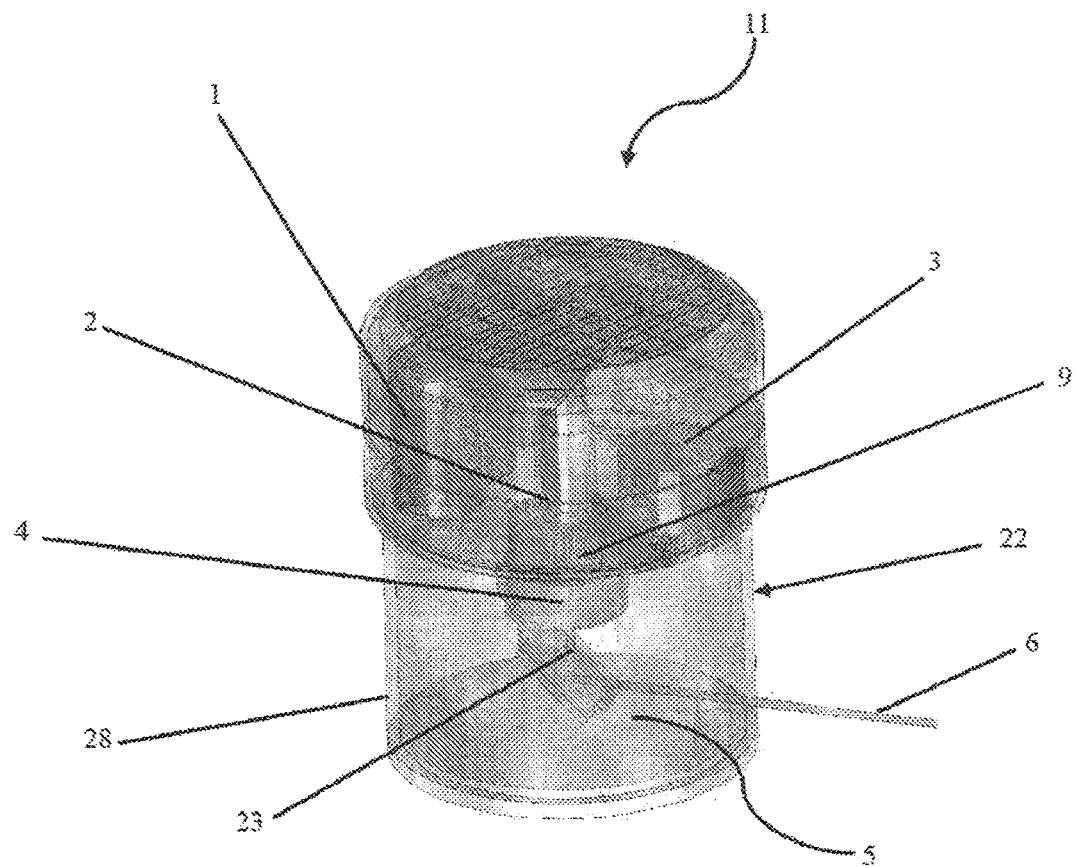
FIG. 1 is an isometric view of an embodiment of the animal dispersion system.

The present invention provides a non-lethal method to disturb or disrupt a habitat of undesirable animals in a low maintenance and cost effective manner.

In particular, the invention includes an animal dispersion system 11 and method for providing an outwardly propagating laser beam that is shaped and configured to efficiently disrupt or disturb nuisance animals such as geese or birds. This outwardly propagating laser beam is formed through a combination of elements including a laser source 2 and a rotatable reflective surface 5 that are spaced from one another and disposed within a housing 22. In general, the laser source 2 can emit a laser beam in a direction toward a reflective surface of the rotatable reflective surface 5 which is at least partially aligned with the laser source 2. The laser source 2 can include a single laser beam, a plurality of laser diodes, or any other laser device as is generally known in the art. The reflective surface 5 reflects the laser beam outwardly to form the resultant beam that can propagate outwardly so as to disrupt or disturb nuisance animals. In one example, the outward resultant beam can include a wavelength range of 400 nm to 700 nm which is a range for visible light and is effective to disrupting or disturbing animals such as geese or other birds.

As shown in FIGS. 1-4, the animal dispersion system 11 includes the laser source 2 and the reflective surface 5 may be contained within the housing 22. The housing 22 can also include a variety of elements such as a rotatable member 4 and a lens 12. The system 11 may also include other components such as a power source or battery 1, a controller 7, and a drive motor 3. The housing 22 can also be shaped in a variety of different ways as desired and can include an outer periphery 28 having at least a portion that is transparent so as to permit the outward resultant beam to propagate from the housing 22.

The elements and components within the housing 22 can be configured in multiple different arrangements to provide the desired outward resultant beam. In one example, and referring to FIGS. 1 and 3, the laser source 2 can be disposed in an upper portion of the housing 22 and orientated to emit an initial beam 23 along a generally vertical beam path that is perpendicular to the ground. The reflective surface 5, which could be a mirror, is disposed at a lower portion within the housing 22 and extends along an axis that is traverse to the vertical beam path. The reflective surface 5 is also positioned within the housing 22 where at least a portion of the reflective surface 5 is at least partially aligned with the vertical beam path such that the initial beam 23 can be reflected by the reflective surface 5. In other examples, the laser source 2 and the reflective surface 5 can be formed as a single assembly so as to minimize or reduce wires or other connectors.

The reflective surface 5 can be angularly oriented to the vertical beam path and movable through a range of angles from 5 to 85 degrees. This movable angular orientation can assist in controlling the shape and direction of the resultant outward beam 6 as desired. In one example, the reflective surface 5 can be oriented at a 45 degree angle to the vertical beam path which can cause reflection of the outward resultant beam generally parallel to the ground. Other angles, however, can be used to cause a reflection of the outward resultant beam in different directions which can result in a horizontal, vertical, or angled resultant beam.

In another example, the reflective surface 5 can be configured to oscillate, or "wobble", between a range of angles as the it rotates. This can result in a resultant beam that propagates outward at different angles throughout the 360 degrees of rotation.

Figure 2:
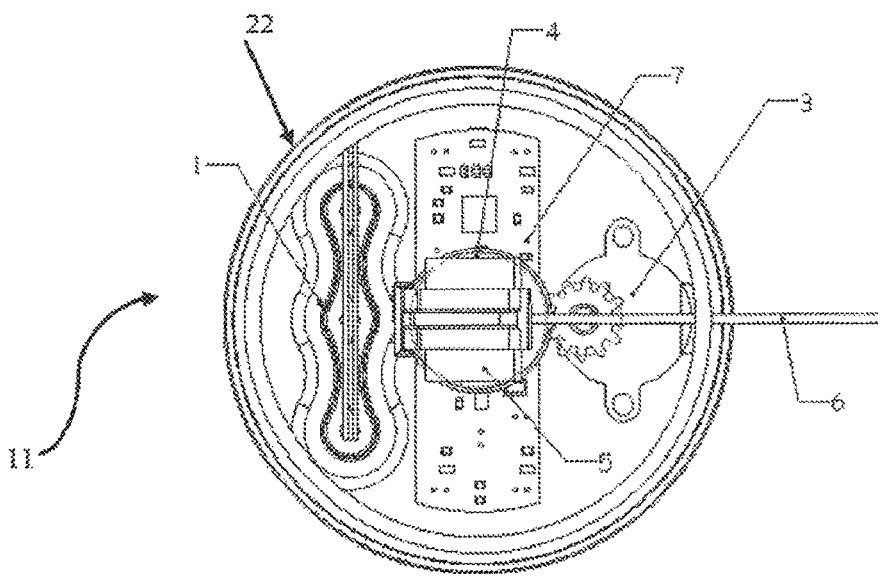
FIG. 2 is a top view of an embodiment of the animal dispersion system.
Figure 3:
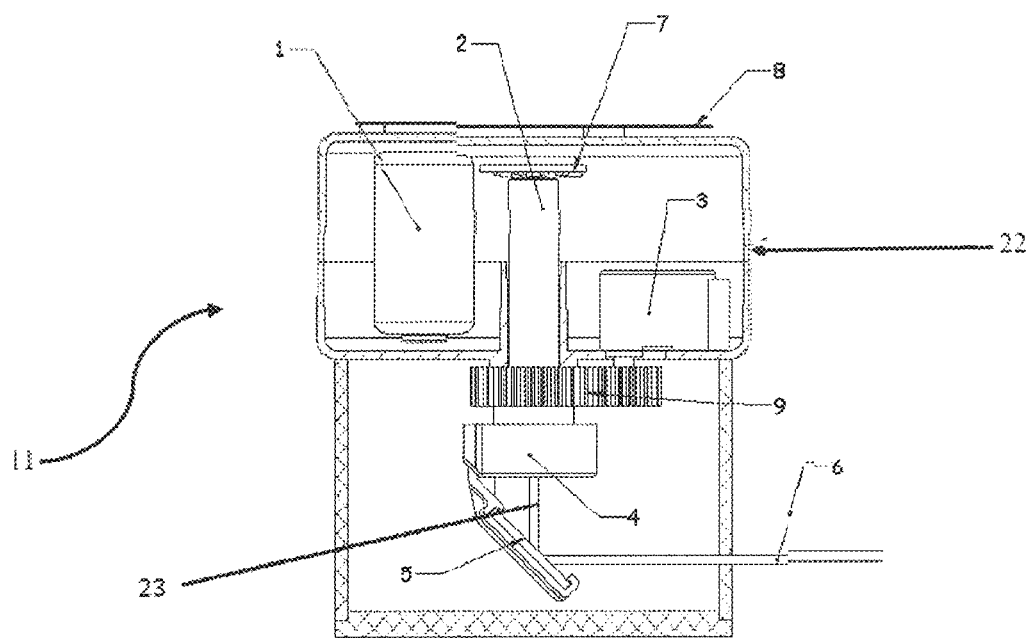
FIG. 3 is a side view an embodiment of the animal dispersion system.

Referring to FIGS. 1-4, the rotatable member 4 can also be located within the housing 22 and is mechanically or operatively coupled to the mirror 5 to permit rotation along a 360 degree radial path. This rotation permits the mirror 5 to rotate with respect to the vertical beam path and to reflect the beam emitted from the laser source 2 in a 360 degree field of range. As shown in FIGS. 1 and 3, the rotatable member can be driven by an actuator 9. In one example, the actuator is configuration of gears 9 that are operatively connected to the drive motor to permit assembly rotation. The gears 9 can include a large hub and a small hub so as to drive rotatable but other gear configurations can also be used as is known in the art.

Figure 4:
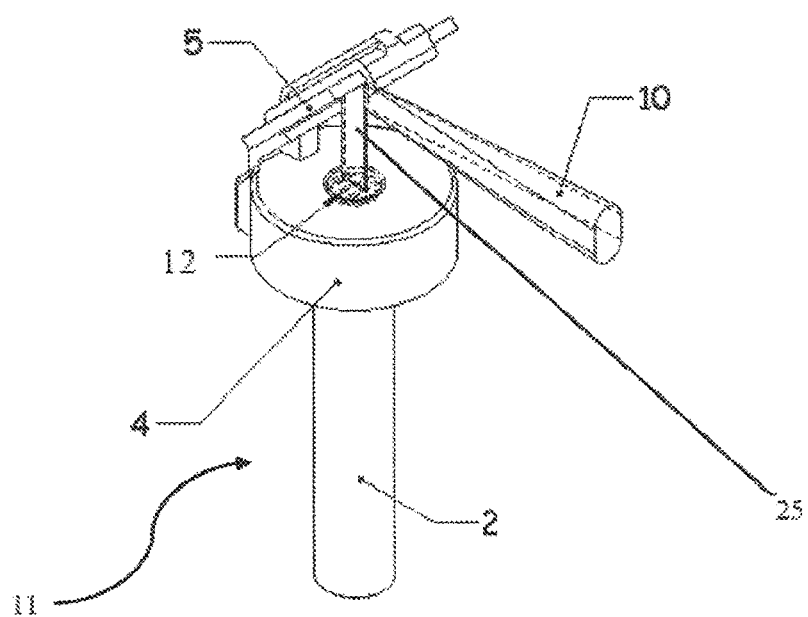
FIG. 4 is a perspective view of an embodiment of the animal dispersion system.

As shown in FIG. 4, the lens allows for additional control of the shape and characteristics of the outward resultant beam 10. For example, the lens 12 assists in optically dispersing a circular laser beam to a thin straight line beam. In particular, the lens 12 can be disposed between the laser source 2 and mirror 5. The lens 12 can also be operatively coupled to the rotatable member 4 and arranged to rotate in response to rotation of the rotatable member 4 along with the reflective surface 5.

In one example, the orientation of the lens 12 to the mirror 5 changes the shape of the resultant beam 10. For example, and still referring to FIG. 4, the lens 12 optically disperses a circular initial laser beam emitted by the laser source to a thin straight line beam 25. The thin straight line beam 25 has a substantially thin and horizontal cross-section. This allows for greater control of the shape and pattern of the outward resultant beam 10. As the thin straight line beam 25 continues along the vertical path, it is reflected by the mirror 5 and forms the outward resultant beam 10. Given the shape characteristics of the thin straight line beam 25, the reflection results in an outward resultant beam 10 which has a desirable spread shape in the vertical direction. This shape permits the outward resultant beam 10 to case along a wider field and be more effective in dispersing animals.

Referring to FIG. 4, the lens 12 can also be a Powell or Line lens as is generally known in the art. As is known in the art, Powell Lines, or Line lenses, include characteristic that help convert rounded laser beams into uniform and straight line beams (ex a non-conical beam). In particular, the Powell lens includes a two-dimensional aspheric curve that generates spherical aberration that redistributes the light along the line. This causes a decrease in the light in the central area while increasing the light level at the end of the line. The result is a uniformly illuminated line.

The lens 12, when mounted on or operatively coupled to the rotating member 4, allows for a consistent outward resultant beam shape during rotation. Typical examples of outward resultant beam shapes are, but not limited to, linear, crossed, and spot with linear. By rotating the Powell lens 12 in sync with the rotating reflective surface 5 the beam shape 10 it preserved as the beam is rotated. Alternating the alignment of the lens 12 axially, can also change the resulting axis of the beam 10, to any angle from horizontal to vertical.

Other lenses can also be used to generate more disruptive patterns for the outward resultant beam. For example, the "Dazzler" lens can be used which would allow for other desirable shaping of the outward resultant beam. Such lens can either be mounted on the rotatable member for a consistent beam shape, or on the static portion of the device to cause a variable beam shape.

As shown in FIGS. 1-3, the battery, or power source, 1 provides power to the controller 7 which controls the operation of the animal dispersion system 11. The battery 1 is recharged by a solar panel 8, and whose output can be monitored to control light power and operation timing. As shown in FIG. 3, the solar panel 8 can provide power which is stored in a rechargeable battery. Through use of a common external connector, however, multiple power source options can be made available.

An electronic control system including the controller 7 can activate a laser at prescribed intervals depending upon the application. The controller 7 controls the operation of the animal dispersion system and can include a processing system having instructions stored in a memory (e.g., processor readable media) to provide the features described herein. Although the controller 7 is shown and described as a printed circuit board assembly (PCBA) incorporating instructions stored in a memory and executed by a processor, it should be understood that the controller 7 may be embodied in other specific forms, such as using discrete and/or integrated analog circuitry, field programmable gate arrays (FPGAs), application specific integrated circuitry (ASICs), or any combination thereof. Additionally, the controller 7 may be omitted if manual operation of the animal dispersion system 11 is desired.

The processing system includes one or more processors or other processing devices and memory. The one or more processors may process machine/computer-readable executable instructions and data, and the memory may store machine/computer-readable executable instructions and data including one or more applications. A processor is hardware and memory is hardware. The memory includes random access memory (RAM) and/or other non-transitory memory, e.g., a non-transitory computer-readable medium such as one or more flash disks or hard drives. The non-transitory memory may include any tangible computer-readable medium including, for example, magnetic and/or optical disks, flash drives, and the like.

In one embodiment, the controller 7 may also include a display, such as a liquid crystal display (LCD), one or more light emitting diodes (LEDs), an LED display, a touch screen, a capacitive display, or another display for displaying configuration settings associated with operation of the animal dispersion system. The controller 7 may also include an input device, such as one or more buttons, switches, or other electro-mechanical device for providing user input. In one example, the display and input device may include a touch screen display for receiving user input and displaying one or more characteristics associated with operation of the animal dispersion system. In one embodiment, the display may include a user interface for displaying information to the user, and receiving user input from the user.

The memory section of the PCBA includes instructions understood by the included processor. These instructions are used to activate other components that will turn on or off the actuator and laser. The PCBA can also perform other functions such monitoring and configuring battery charge and monitoring the ambient light.

Communication methods can be included to allow the delivery of information, such as battery life and system status. The communication method may also include an information delivery technology. The communication method may include wired and/or wireless connections and technologies and be used to transmit and/or receive wired and/or wireless communications.

Communication methods can also be used to modify the stored instructions or even the performance of the device itself. Examples of similar functionality include the remote starting of a car, or the use of a cell phone to turn on lights.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A light-based animal dispersion system comprising:
a housing having an upper portion and a lower portion;
a laser source fixed at the upper portion for providing an initial laser beam along a generally vertical path;
a rotatable reflective member disposed at the lower portion and having a reflective surface extending generally along an axis traverse to the vertical path; and
a Powell lens arranged along the vertical path and between the laser source and the rotatable reflective member for optically dispersing the initial laser beam to a straight line beam toward the reflective surface;
wherein an outward resultant beam is reflected from the reflective surface.

2. The light-based animal dispersion system of claim 1 further comprising an actuator operatively coupled to the rotatable reflective member.

3. The light-based animal dispersion system of claim 2 further comprising a controller operatively connected to the actuator for controlling the outward resultant beam.

4. The light-based animal dispersion system of claim 2 wherein the controller is arranged to adjust the direction of the outward resultant beam.

5. The light-based animal dispersion system of claim 2 wherein the controller is arranged to adjust the pattern of the outward resultant beam.

6. The light-based animal dispersion system of claim 1 wherein the outward resultant beam is generated to disperse animals from a physical area.

7. The light-based animal dispersion system of claim 1 where the outward resultant beam has a wavelength of 400-700 nanometers.

8. The light-based animal dispersion system of claim 1, wherein the laser source is oriented at an angle relative to the reflective surface.

9. The light-based animal dispersion system of claim 1 wherein the outward resultant beam propagates generally parallel to the ground.

10. The light-based animal dispersion system of claim 1 wherein the controller adjusts an angular range of the outward resultant beam.

11. The light-based animal dispersion system of claim 1 further comprising a rotatable member operatively connected the rotatable reflective surface.

12. The light-based animal dispersion system of claim 1 where the controller is adapted to control the intensity of the outward resultant beam.

13. A laser assembly disposed within a housing of a light-based animal dispersion system, the laser assembly comprising:
a laser source for providing an initial circular laser beam along a generally vertical path;
a rotatable reflective surface extending generally along an axis traverse to the vertical path; and
a Powell lens arranged along the vertical path and between the laser source and the rotatable reflective surface for optically dispersing the initial circular laser beam to a straight line beam toward the rotatable reflective surface;
wherein an outward resultant beam is reflected from the rotatable reflective surface.

14. The laser assembly of claim 13 wherein the straight line beam has a generally horizontal cross-section.

15. The laser assembly of claim 13 wherein the outward resultant beam includes a spread shape in the vertical direction.

16. The laser assembly of claim 13 wherein the rotatable reflective surface is oriented at an angle of 45 degrees to the vertical path.

17. The laser assembly of claim 13 further comprising an actuator operatively coupled to the rotatable reflective member.

18. The laser assembly of claim 13 further comprising a controller for controlling the direction of the outward resultant beam.

19. The laser assembly of claim 13 wherein the outward resultant beam is reflected in a 360 degree rotational direction.

* * * * *